Oct. 29, 1963   J. WISHART   3,108,780
VALVE FOR ULTRA-HIGH VACUUM APPARATUS
Filed April 18, 1960   7 Sheets-Sheet 1
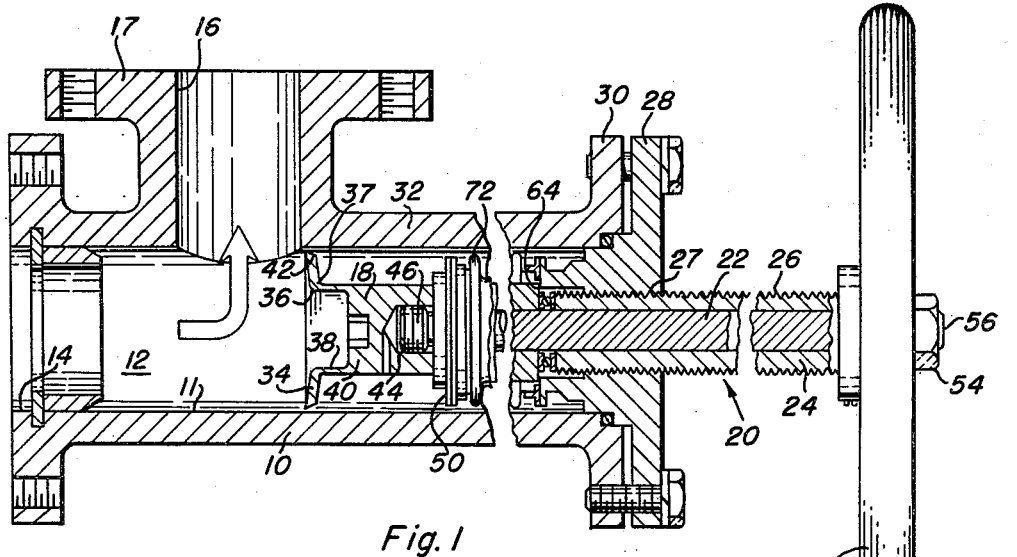
Fig. 1
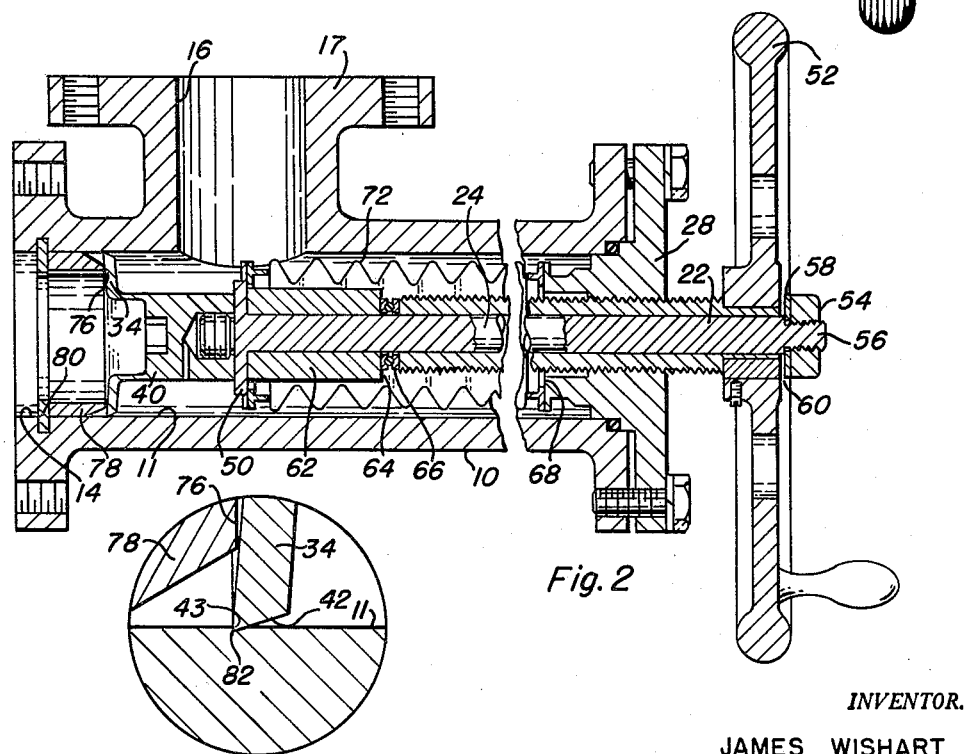
Fig. 2
Fig. 4
INVENTOR.
JAMES WISHART
BY Bernard A. Chiama
ATTORNEY INVENTOR.
JAMES WISHART
BY Bernard A. Chiara
ATTORNEY Oct. 29, 1963 J. WISHART 3,108,780
VALVE FOR ULTRA-HIGH VACUUM APPARATUS
Filed April 18, 1960 7 Sheets-Sheet 4

INVENTOR.
JAMES WISHART
BY Bernard T. Chisma
ATTORNEY

Oct. 29, 1963    J. WISHART    3,108,780
VALVE FOR ULTRA-HIGH VACUUM APPARATUS
Filed April 18, 1960    7 Sheets-Sheet 5

INVENTOR.
JAMES WISHART
BY
Bernard A. Chiama
ATTORNEY

Oct. 29, 1963    J. WISHART    3,108,780
VALVE FOR ULTRA-HIGH VACUUM APPARATUS
Filed April 18, 1960    7 Sheets-Sheet 6

INVENTOR.
JAMES WISHART
BY Bernard A. Chiama
ATTORNEY

Oct. 29, 1963 J. WISHART 3,108,780
VALVE FOR ULTRA-HIGH VACUUM APPARATUS
Filed April 18, 1960 7 Sheets-Sheet 7

INVENTOR.
JAMES WISHART
BY
Bernard A. Chiama
ATTORNEY

United States Patent Office 3,108,780
Patented Oct. 29, 1963

3,108,780
VALVE FOR ULTRA-HIGH VACUUM
APPARATUS
James Wishart, Rochester, N.Y., assignor to Consolidated
Vacuum Corporation, Rochester, N.Y., a corporation
of New York
Filed Apr. 18, 1960, Ser. No. 23,059
3 Claims. (Cl. 251—334)

The present invention relates to valves for ultra-high vacuum apparatus, and more particularly to valves or closure mechanisms which employ only metallic structures and are completely devoid of elastic material or the like.

The problems incident to valves in vacuum apparatus, while generally requiring some of the features of high pressure valves, also are quite unique only in vacuum applications, and, therefore, what may be very advantageous for high pressure work may be detrimental in vacuum use. Notably, the use of seals made from elastomeric materials such as O-rings, rubber gaskets, packing and the like are not only insufficient for maintaining a vacuum seal, but these devices work counter to the evacuation process. During pump-down, these devices release gases and vapors which enter the system to be evacuated and must be pumped out along with the atmosphere in the system.

In avoiding these disadvantages of non-metallic elastic sealing devices, a more recent trend has incorporated deformable or malleable metal sealing devices with a movable valve element. During closing of these valves, the sealing device would be deformed beyond their elastic limits, thus necessitating the replacement of the sealing device after each operation, or, at least, after a few closings of the valve.

The present invention incorporates an entirely new approach to the sealing problem for vacuum valves or closure devices and provides a disk shaped valve or closure element having a bevelled peripheral edge which may be driven into the metal of the surrounding valve body wall during each closing operation of the valve. With a unique geometrical design embodied into the valve element and adhering to certain ranges of relative dimensions, the action of co-acting metal structures is positive in operation resulting in a leak-proof seal between the structures. Other dimensional relationships such as the sharpness of the peripheral edge, axial stroke of the valve element and the length of the valve body permit the continual use of the valve which may be measured in the hundreds of cycles of closing operations.

There is also provided various devices for insuring that the "bite" of the peripheral edge into the valve body wall occurs at different portions of the wall so that the co-acting metal parts will produce the same reliable vacuum tight sealing effect between these parts at every actuation of the valve during a long series of closing operations. In a more basic application, such devices are not necessary since the valve element may be driven into the valve body wall at precisely the same position thereon for many cycles of operation before a groove formed in the wall thereof is large enough to prevent an adequate sealing relationship.

The primary object of the present invention is to provide a valve for ultra-high vacuum apparatus which incorporates a novel metal-to-metal arrangement between the movable valve element and its co-acting valve seat so that the valve may be operated through many cycles of operation without affecting the leak-proof sealing capabilities incident to the valve.

Another object of the invention is to provide an improved all-metal valve of simple design and having an arrangement of a minimum of structural elements, the valve being capable of ready assembly and disassembly for permitting the removal or substitution of parts.

Still another object of the invention is to provide an improved valve structure which can be readily adapted for operation in any one of a number of valve bodies of varied design and combined with various valve actuators for permitting manual, automatic or remote control.

Other objects and advantages will become apparent from the following detailed descriptions when taken in conjunction with the drawings wherein:

FIGURE 1 is a vertical section of a valve body incorporating the features of the present invention and in one position of operation;

FIGURE 2 is a view similar to FIGURE 1 illustrating the valve in another condition of operation;

FIGURE 3 is an enlarged view of a detail of the present invention;

FIGURE 4 is an enlarged fragmentary view of the detail of FIG. 3;

Figure 5:
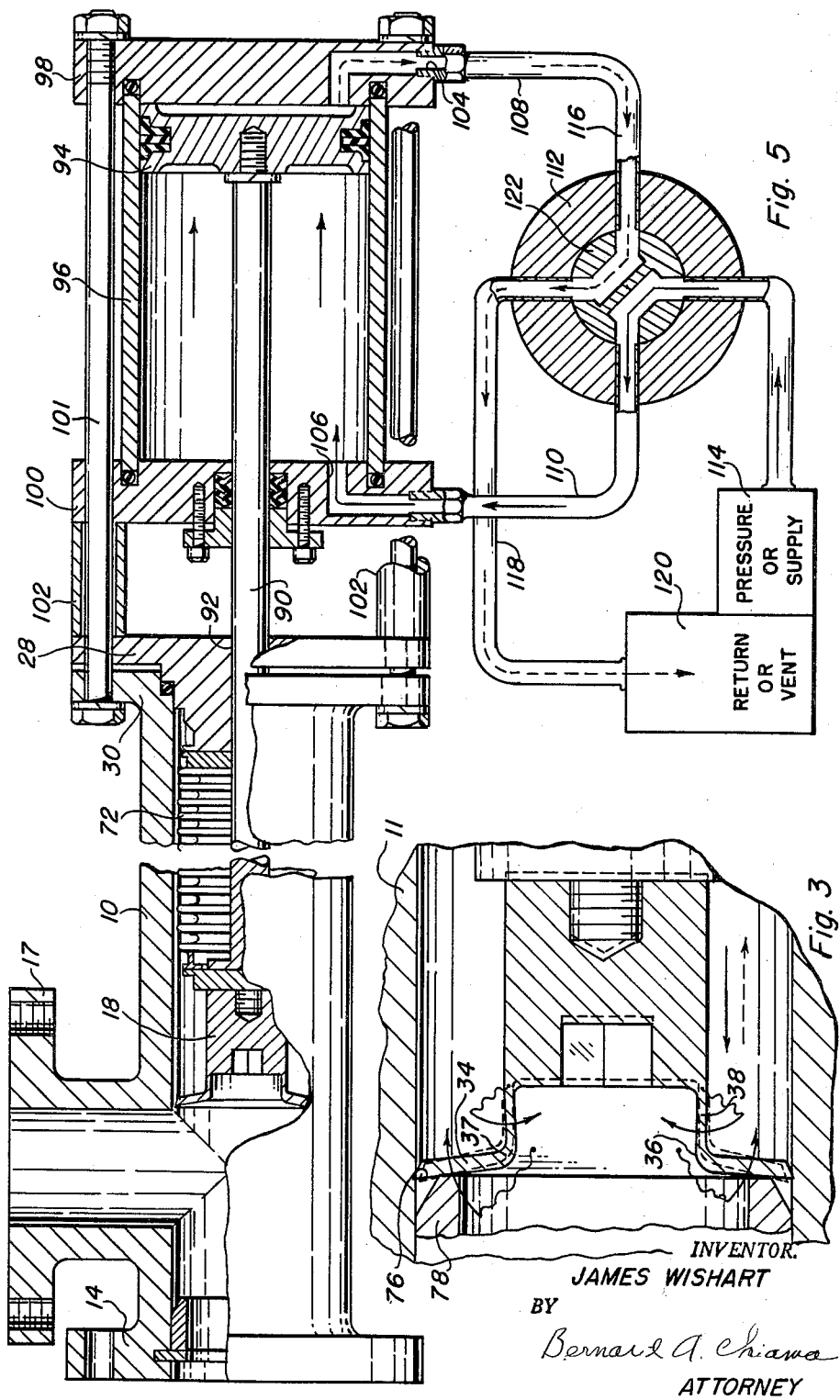
FIGURE 5 is a schematic of the valve illustrated in FIG. 1 shown in combination with a remote control actuator.

Referring now to the embodiment of the invention illustrated in FIGS. 1–4 of the drawings there is shown an ultra-high vacuum valve comprising a valve body 10 having cylindrical interior wall 11 for defining a valve chamber 12 which communicates with the interior of an inlet port 14 arranged substantially in alignment with the longitudinal axis of the valve body, and an outlet port 16 formed in a right angle extension 17 of the valve body and entering the chamber 12. The port 14 may be connected to a system or chamber to-be-evacuated and the extension 17 connected to a suitable pumping system. A valve or closure element 18 is adapted to be moved longitudinally within the chamber 12 by means of a drive means generally indicated by the reference numeral 20 for sealing the chamber to-be-evacuated from the pumping system.

The drive means 20 comprises a shaft 22 mounted in a drive sleeve 24 which is formed with external threads 26 extending along most of the length thereof. The sleeve is threadedly received in a central opening 27 formed in a cover plate 28 which is suitably secured to the adjacent mounting flange 30 formed on the cylindrical portion 32 of the valve body 10. In this manner, the sleeve 24 may be moved longitudinally in either direction simply by rotating the same in a corresponding manner to thereby effect movement of the shaft 22 in either direction and consequently the valve element 18. As shown in FIGURES 1 and 2 the longitudinal axes of the shaft 22 and sleeve 24 are in co-axial alignment with the longitudinal axis of the valve body 10.

The valve element 18 is provided with a conical spring disc 34 having a central opening 36 defined by a circular juncture 37 formed with a tubular portion 38 connected at one end centrally of the disc, and a cylindrical portion 40 made integral with and bridged across the other end of the tubular portion 38. The valve element 18 is preferably formed as a singular structural element machined from metal stock and heat treated to a spring temper. The heat treatment should be sufficient to increase the hardness of the valve element beyond the hardness of the valve body. With the valve element 18 formed of spring tempered metal, the disc 34 and the tubular portion 38 are capable of experiencing limited forces tending to flex the same without incurring permanent deformation. The outer peripheral surface 42 of the disc 34 is chamfered to form a sharp circular edge 43 and has its center of curvature on the common axis for the juncture 37 and the axes of the tubular portion 38 and cylindrical portion 40.

The diameter of the chamfered-formed edge 43 is slightly less than the diameter of the chamber 12 so that the valve element 18 may be moved between the positions shown in FIGS. 1 and 2. Under certain conditions, as will be described in detail hereinafter, the circumference of the edge 43 may be expanded beyond the circumference of the chamber 12 resulting in limited projection of the edge 43 into the surface of the interior 11.

At the end of the cylindrical portion 40 of the valve element 18 remote from the disk 34, there is a centrally arranged interiorly threaded bore 44 for receiving a threaded stud 46 integrally formed at the end of the shaft 22. An annular flange 50 made integral with the shaft 22 adjacent the stud 46 serves as a limiting stop for the turning of the valve element upon the stud.

Movement of the valve element 18 is effected by the rotation of the threaded sleeve 24 by means of a handwheel 52 keyed to the outer end of the sleeve. A nut 54 secured upon a threaded and reduced extension 56 of the shaft 22 and engageable with a washer 58 positioned to encircle the extension serves to retain the handwheel upon the sleeve. The washer 56 engages a shoulder 60 of the shaft 22 spaced slightly from the adjacent end of the sleeve 24 to prevent frictional contact with handwheel and thereby relieve the shaft 22 of any rotational effect produced by rotation of the sleeve at this point.

As previously stated, the sleeve 24 supports the shaft 22 and drives the latter in either direction along its longitudinal axis. For this purpose there is provided a cylinder 62 through which the shaft 22 extends between the flange 50 and the inner end of the sleeve 24. In order to drive the shaft 22 to the left, as shown in FIG. 2, the inner end of the sleeve is adapted to co-act with the adjacent end 64 of the cylinder 62 to carry the same therewith. A suitable ball-bearing 66, encircling the shaft 22, is interposed between the end 64 of the cylinder 62 and the inner end of the sleeve and thereby minimizes the frictional effect produced between the rotation of the sleeve and the non-rotating shaft. The diameter of the cylinder 62 is made greater than the diameter of the opening in the cover plate 28 to permit the engagement of the end 64 of the cylinder with the end surface 68 of the cover plate in order to limit the outward movement of the shaft 22, as shown in FIG. 1.

To completely maintain the shaft against rotation and to seal the valve chamber 12 from external effects such as air or other gases that may seep between the sleeve and shaft, there is provided a bellows 72 secured at one end by a suitable weld to the periphery of the flange 50 and at the other end to the end surface 68 of the cover plate 28. The bellows 72 is preferably made from spring material and has sufficient structural strength to maintain the shaft 22 against any tendency to rotate due to slight friction that may be produced through the bearing 66 and the effect of the positioning of the shaft within the sleeve. It will be appreciated then that in moving the valve element 18 to the position shown in FIG. 2, the rotation of the sleeve 24 in one direction will drive the shaft longitudinally to the left against the resiliency of the bellows 72. Conversely, rotation of the sleeve in the other direction will cause the end of the sleeve to engage the washer 58 for moving the nut 54 therewith to force the shaft to follow the sleeve and thereby move the valve element to the position shown in FIG. 1.

For a more detailed description of the valve element 18 there is shown in FIGURES 3 and 4, the valve element in closed position wherein the peripheral edge 43 is embedded in the wall 11 of the valve body chamber 12. As previously stated, the peripheral edge 43 normally has a diameter slightly smaller than the diameter of the chamber 12. As the valve element 18 is moved from the position indicated in FIGURE 1, past the outlet port 16 and into the position indicated in FIGURE 2, the valve element 18 engages one circular end 76 of a ring 78 positioned within the chamber 12 and locked therein against axial movement by a suitable locking ring 80. This position of the valve element 18 is indicated by dotted lines in FIGURE 3, wherein the disc 34 engages the ring 78 and the peripheral edge 43 is slightly spaced from the wall 11. Further movement of the valve element 18 under forces produced by the rotation of handwheel 52 and transmitted by means of the sleeve 24 and shaft 22 will impart a further axial force to the disc 34 and cause the same to flex slightly to a more flat condition as indicated in FIGURE 3 by the solid lines. The axial force imposed upon the disc 34 and the resultant flexing thereof will cause a uniform expansion of the circumference of the peripheral edge 43. This expansion is such that the edge 43, which as previously stated, has a greater hardness than the valve body, will project slightly into the material of the wall 11. This slight flexing of the disc 34 and flattening thereof also decreases the diameter of the opening 36 for the disc and the circular juncture 37, which action causes the adjacent end portion of the tubular portion 38 to flex inwardly along its circumference. Consequently, this force upon the tubular portion 38 produces a counterforce by virtue of its spring temper against the juncture 37 for imparting a uniform outwardly directed radial force to the disc 34 thereby maintaining a constant and continuous pressure of the peripheral edge 43 against the wall 11. The flexible nature of the tubular portion also serves as an override structure for the contraction of the juncture 37 during axial flexing of the disc 34. As a result of this operation, there is formed in the wall 11 a groove 82 as shown in FIGURE 4 which is produced by the "bite" of the extreme tip of the edge 43 into the material of the valve body. With the edge 43 partially embedded in the wall 11 and held therein under forces produced by the flattening of the disc 34 and the peripheral flexing of the adjacent end of the tubular portion 38, a vacuum tight seal is effected between the valve element 18 and the wall 11.

In order to open the valve, the handwheel is turned in the opposite direction to permit the tubular portion 38 and the disc 34 to assume their unflexed conditions which allows the peripheral edge 43 to assume its normal dimensions. Further rotation of the handwheel will move the valve element 18 back to its original position as shown in FIGURE 1. This operation may be repeated many times before the groove 82 is enlarged to a point at which an effective seal can no longer be maintained relative to the edge 43. In the event that the groove 82 is enlarged beyond its effectiveness, the ring 78 may be replaced by a ring having an axial length greater or smaller than that shown in the drawings so that another groove may be formed as previously described.

It is to be understood that the relative dimensions illustrated in the drawings are exaggerated for descriptive purposes only and that the groove 82 may have a maximum depth of only a few ten-thousandths of an inch and a width of a few thousandths of an inch and that the flattening of the disc 34 may involve only two or three degrees of change in shape. It will be appreciated then, that the change of length of the ring 78 need only be slight and if the range of lengths for the ring 78 is approximately one inch, the number of new grooves that may be formed and utilized may total approximately one hundred. Assuming that each groove may be utilized at least a thousand times and that the ring 78 may vary in usable length a hundred times, then it may be easily deduced that the present valve element structure is capable of many thousands of cycles of operations.

In FIGURE 5, the valve structure illustrated in FIGS. 1–4 is shown as being actuable by means of a hydraulic or pneumatic system. In this adaptation of the valve structure there is no provision for a drive sleeve such as sleeve 24, disclosed in FIGURES 1–4, and a shaft 90, similar to the shaft 22 extending a substantial distance beyond the cover plate 28, is provided for actuating the valve element 18. A suitable opening 92 is formed centrally in the plate 28 for slidably mounting the shaft 90. At the outer end of the shaft 90 there is secured by any suitable means a piston 94 which is slidably received and mounted within a cylinder 96. The cylinder 96 is arranged in axial alignment with the valve body 10 and may be mounted thereon by means of plates 98 and 100 secured to the ends of the cylinder, respectively, and bolts 101 for mounting these plates to the flange 30 and cover plate 28. Spacers 102 may be utilized with the bolts 98 between the plate 100 and the flange 30 for spacing the cylinder 96 from the valve body 10.

Pressure means are provided for actuating the piston 94 in either direction within the cylinder 96, and to this end a passageway 104 is formed in the plate 98 communicating with the interior of the cylinder 96 above the piston 94. Similarly a passageway 106 is formed in the bottom plate 100 and communicates with the interior of the cylinder below the piston 94. The passageways 104 and 106 are connected by tubings 108, 110, respectively, to a four-way valve 112 for connection to a source 114 of hydraulic fluid or air under pressure. A tubing 116 connects the source to the valve 112 for transmitting fluid or air under pressure to either side of the piston 94 while a tubing 118 transmits the return of the fluid or air to a suitable sump 120. The valve 112 is provided with a valve element 122 which is adapted for 90 degree rotative movement. In the position shown in FIGURE 5, the pressure tubing 116 is in communication with the passageway 106 by way of the tubing 110 as indicated by the solid line arrows. With the parts in this position, fluid under pressure is conduced to the cylinder 96 underneath the piston 94 for moving the latter upwardly and thus actuate the valve element 18 to an open position as shown in FIGURE 5. Any fluid present in the cylinder 96 above the piston 94 will be forced out of the cylinder through the passageway 104, the tubing 108, through the valve 112 into the sump by way of tubing 118. Rotation of the valve element 122 in a clockwise direction for 90° will connect the pressure tubing 116 to the passageway 104 for inducing pressure into the cylinder 96 above the piston 94 for forcing the latter downward to close the valve element 18. The embodiment disclosed in FIGURE 5 may be utilized for relatively large valves or is adapted for remote operation whereby the valve 112 may be suitably arranged on a control panel at any distance from the valve 10.

In the embodiment of FIGS. 6–9, means are provided for producing a vacuum tight seal at various points along the valve body chamber by adjustable devices located entirely without the valve, thus eliminating the necessity for dismantling the same for effecting a change of sealing positions. The embodiment of FIG. 6, comprises a valve body 120 formed with a cylindrical interior wall 122 for defining a valve chamber 124. A flanged inlet port 126 arranged coaxially of the valve chamber is positioned at one end of the valve body 120 and an outlet port 128 having its interior in communication with the chamber 124 is arranged perpendicular to the axis thereof. The inlet 126 may be connected to a system to be evacuated and the outlet 128 connected to a pumping system.

Slidably mounted within the chamber 124 is a valve or closure element, indicated generally at 130, having the basic structural features of the valve element 18 of the embodiment illustrated in FIGS. 1–4. The valve element 130 is actuated between various controlling positions within the chamber 124 by means of an actuator mechanism indicated generally by the reference numeral 132.

The actuator 132 is movable within the valve body 120 and includes a drive sleeve 134 and a shaft 136 mounted within the sleeve and movable therewith under certain conditions and relative thereto under other conditions of operation. One end 138 of the sleeve, adjacent the inlet port 126, is slidably retained by the wall 122 of the valve body for supporting this end of the actuator mechanism. The other end portion 139 of the sleeve has a reduced diameter with threads formed thereon and an internally threaded hub 142 receives the end portion 139 and serves to support this end of the spindle 134 to the valve body.

Means are provided for mounting the hub 142 for rotation but without axial displacement so that the sleeve 134 may be moved axially in either direction and, to this end, the external surface at one end of the hub 142 is formed with a rim 144 rotatably mounted in an annular groove 146 formed in a flange 148. A ring 150 secured to the flange 148 by suitable bolts encircles the hub 142 and overhangs the rim 144 for preventing displacement of the rim from its positioning within the groove 146. The axial thickness of the rim is slightly less than the depth of the groove and with the ring 150 defining one side of the groove, there is sufficient clearance therein to allow rotation of the hub 142 while maintaining its position relative to the flange 148.

The flange 148 is secured by suitable bolts to a cooperating flange 152 which in turn is welded to the adjacent end of the valve body 120. A suitable metallic sealing ring 154 is interposed between these flanges in order to seal the interior of the valve against leakage therein. With the parts so far described in their positions shown in FIG. 6, the axes of the elements 120, 134, 136, 142, 144, 148 and 152 are in coincidence.

A handwheel 156 is secured to the hub 142 for rotating the same and with the hub locked against axial displacement, rotation of the handwheel in either direction will drive the sleeve 134 and consequently, the shaft 136 and the valve element 130 in a corresponding direction along their axes. In order to limit the extent of the outward movement of the sleeve 134 so that the same will not be inadvertently pulled through the valve body, a stop shoulder 158 is formed on the exterior of the sleeve at the inner end of the threaded portion 139 for engaging the end 157 of the hub 142 when the sleeve has been extended outwardly to this point.

Figures 6, 7:
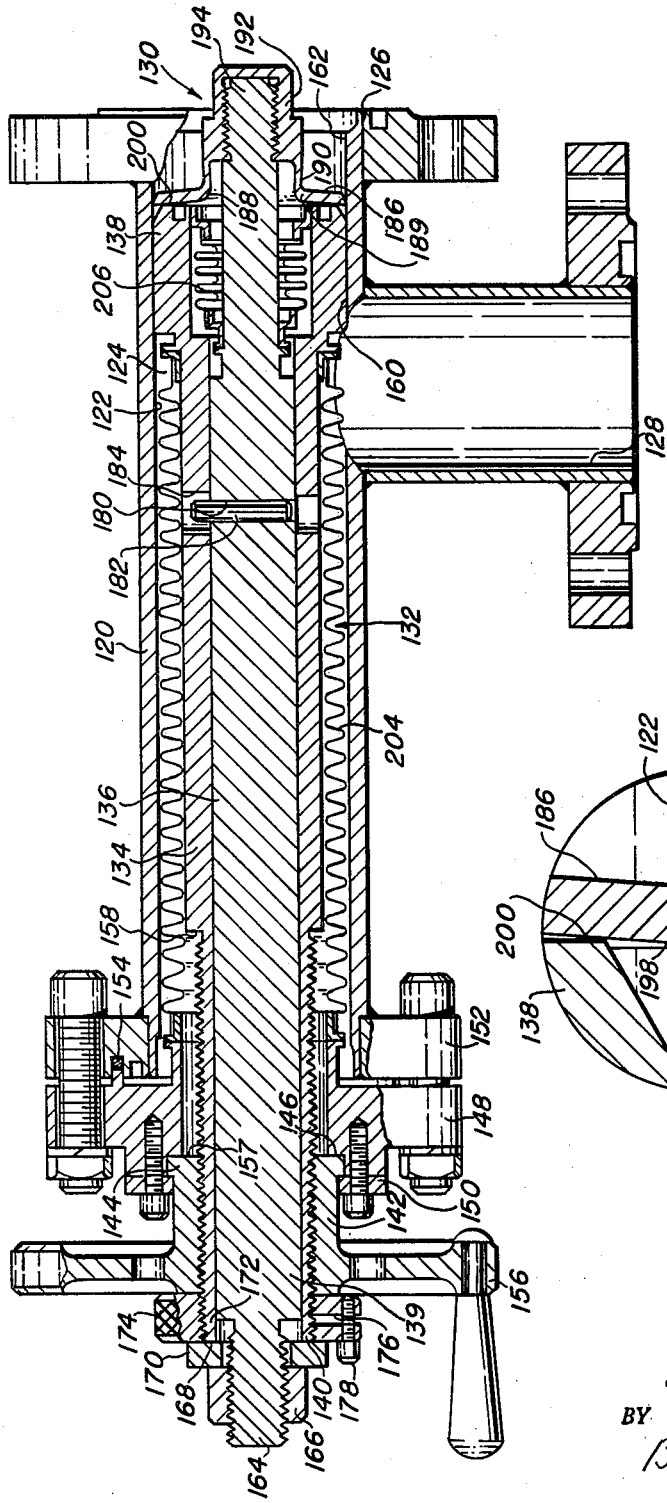
FIGURE 6 is a vertical section of another form of valve body incorporating the present invention.
FIGURE 7 is an enlarged fragmentary view of a detail of the present invention illustrated in FIG. 6.
Figure 8:
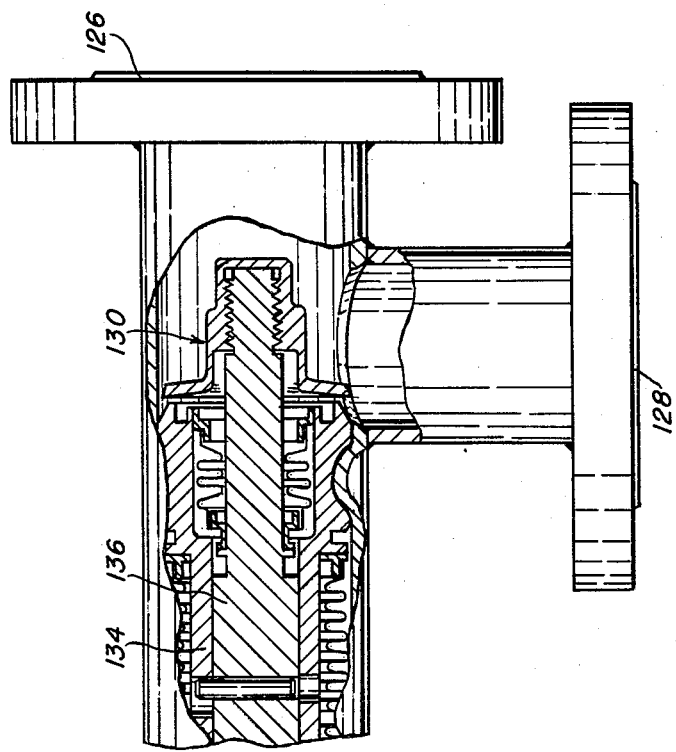
FIGURE 8 is an exploded elevational view of the valve of FIG. 6 shown partly in section and in another position of operation.

As shown in FIG. 6, the valve element 130 is in a closed position of operation. Rotation of the handwheel 156 in a corresponding direction will move the sleeve 134 and the shaft 136 to the left carrying therewith the valve element. The open position of operation for the valve element and the relative positioning of the parts of the valve is illustrated in FIG. 8 wherein the valve element is at a point to the left of the outlet port 128. The distance so traversed by the valve element in moving from the open to the closed positions should correspond to the length of the threaded portion 140 of the sleeve 134 that is moved by the rotation of the handwheel. The valve element 130 is capable of engaging the interior wall 122 of the valve body and becoming locked thereto with a vacuum tight seal anywhere between a point 160 located adjacent the outlet port 128 and a point 162 located adjacent the inlet port 126. The exact position of where the seal will be made may be determined by the amount of rotation of the handwheel 156.

Means are provided for imparting limited axial movement to the shaft 136 relative to the sleeve 134 for a purpose to be described hereinafter. This means comprises a threaded rod 164 formed integrally to the outer end 140 of the shaft 136 and projecting along the axis thereof. A valve closing nut 166 is threadedly mounted on the rod 164 and movable therealong for effecting movement of the shaft 136 relative to the drive sleeve. Between the nut 166 and the extreme outer end 168 of the drive sleeve 134 is interposed a bearing ring 170 which loosely encircles the threads of the rod 164. With the nut 166 turned until it engages the ring 170 which serves as a bearing for this turning and the latter engaging the end 168 of the sleeve 134, further turning of the nut 166 will drive the shaft 136 outwardly relative to the sleeve 134. The purpose of this limited relative movement between the shaft 136 and the sleeve 134 will be described hereinafter.

Threaded upon the extreme outer end 172 of the sleeve 134 beyond the outer end of the hub 142 is a lock nut 174 which is adapted for engagement with the adjacent end of the handwheel 156. The lock nut 174 limits the inward movement of the sleeve 134 during rotation of the hub 142 and such a condition is illustrated in FIG. 6, wherein the nut 174 is against the hub 142. When the hub is rotated in a direction to move the sleeve 134 in the outward direction, the ring nut 174 will move therewith away from the hub 142, as shown in FIG. 8. It will be apparent that the positioning of the valve element to any desired position between the points 160, 162 may be accomplished by rotating the nut 174 relative to the drive sleeve so as to vary the amount of axial movement that the shaft 136 may travel before the nut 174 comes in stopping engagement with the hub 142.

The ring nut 174 is formed with a cut-out sector 176 and a screw 178 is threadedly received in aligned tapped bores formed in the remaining portions of the nut between the cut-out sector. Tightening of the screw 178 will lock the ring nut 174 relative to the end portion 172. It will be apparent that the limit of axial movement of the sleeve 134 upon rotation of the adjusting hub 142 in either direction, will be defined by the distance between the shoulder 158 and the positioning of the lock nut 174 upon the end portion 172. To adjust this distance, the locking screw 178 may be loosened and the nut 174 turned relative to the end portion 172 in order to adjust the effective length of the threaded portion of the sleeve 134.

A bore 180 is formed radially in the shaft 136 intermediate its ends and slidably retains a lock pin 182 therein. One end of the lock pin extends into a slot 184 formed in the wall of the sleeve 134 parallel to the axis thereof and is movable within this slot during relative movement between the shaft 136 and the sleeve 134 during full actuation of the nut 166 in either direction upon the threaded rod 164. The end of the pin 182 within the slot 184 is held by the sides thereof for preventing rotary motion of the pin and consequently rotation of the shaft 136 during turning of the nut 166 in either direction.

The valve element 130 shown in FIG. 6, comprises a conical spring disc 186 having a central opening 188 defined by a circular juncture 189 formed with a tubular portion 190 connected at one end centrally of the disc 186 and a cylindrical portion 192 made integral with and bridged across the other end of the tubular portion 190. It will be apparent that the valve element 130 is very similar to the valve element 18 disclosed in FIGS. 1–5, and differs therefrom in the manner in which force is applied to effect a closing condition of the valve element.

Figure 9:
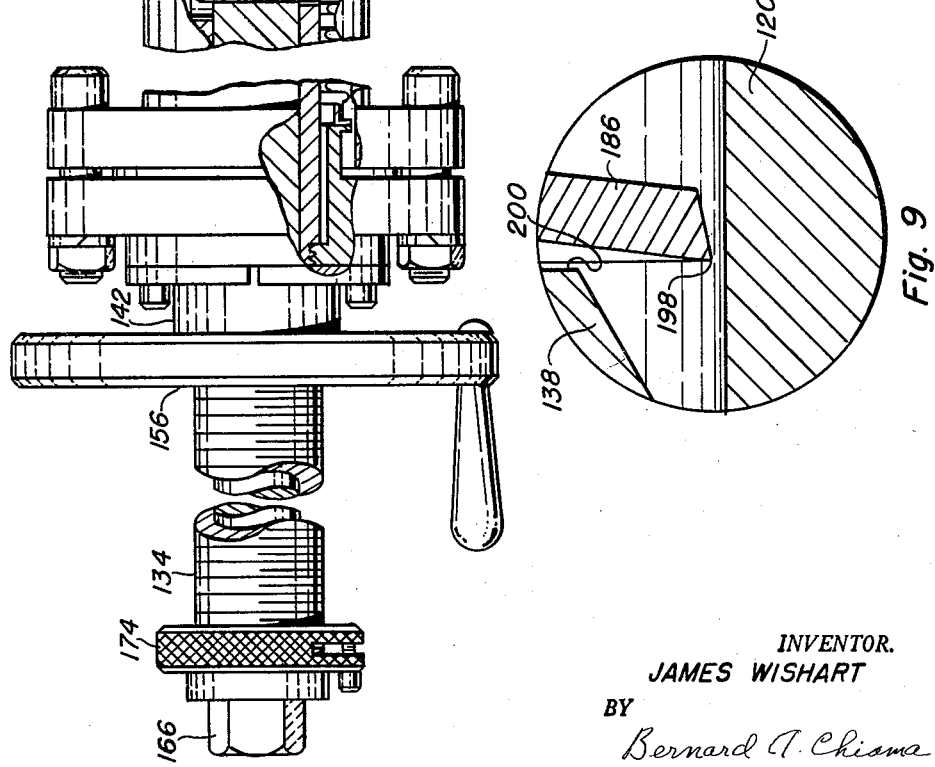
FIGURE 9 is an enlarged fragmentary view of detail of the valve shown in FIG. 8.
Figure 10:
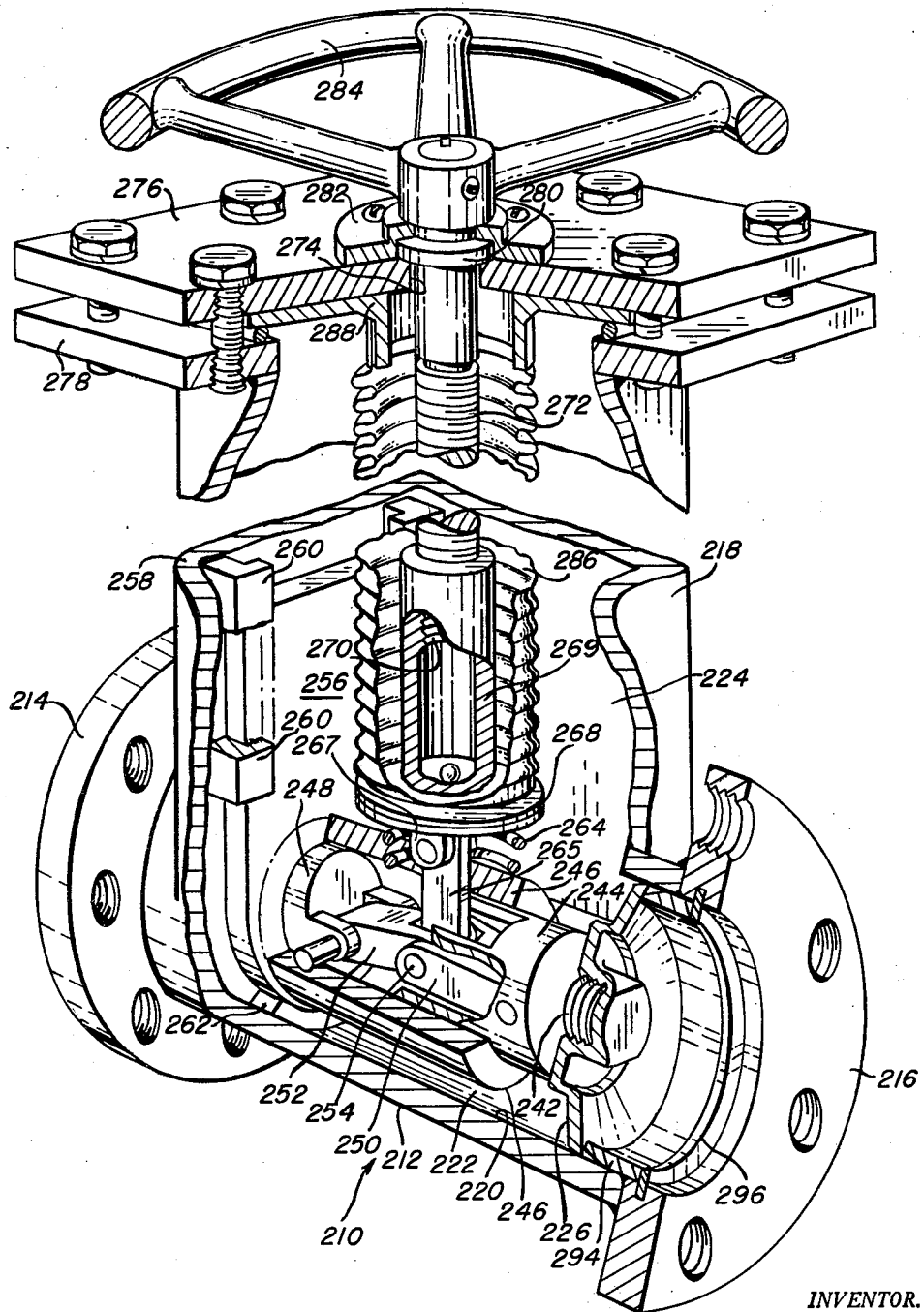
FIGURE 10 is a perspective view of another form of valve embodying the present invention and incorporating another form of actuator for the valve element.

The cylindrical portion 192 is internally threaded and is detachably secured to a threaded rod 194 formed at the extreme outer end of the shaft 136. Preferably, the valve element 130 is formed as a singular structural element machined from metal stock and heat treated to a spring temper and hardness greater than that hardness of the wall 122. As shown in FIGS. 7 and 9, the outer peripheral surface 196 of the disc 186 is chamfered to form a sharp circular edge 198 having its center of curvature on the axis of the shaft 136 as are the axes of the threaded rod 194 and the tubular portion 190.

In the normal unflexed condition of the disc 186, the diameter of circular edge 198 is slightly less than the diameter of the chamber wall 122 so that the valve element 130 may be moved between its open and closed positions. In order to expand the diameter of the circular edge 198 until the same becomes imbedded into the wall 122 of the valve body, the valve element 130 is forced inwardly or to the left as shown in FIG. 6, by rotation of the nut 166 upon the rod 164 to effect movement of the shaft 136 relative to the sleeve 134. This action upon the valve element positions the disc 186 against the outer circular end 200 of the portion 138 of the drive sleeve. Continued movement of the valve element under the force produced by the rotation of the nut 166 will impart a further axial force to the disc 186 and cause the same to flex slightly. The axial force imposed upon the disc will cause a uniform expansion of the circumference of the peripheral edge 198 and is sufficient to cause the edge 198 to project slightly into the material of the wall 122. As was the case for the valve element 18 in the embodiment of FIGS. 1–5, the slight flattening or axial flexing of the disc 186 decreases the diameter of the opening 188 and the juncture 189, which action causes the adjacent end portion of the tubular portion 190 to flex inwardly or radially along its circumference. A counter-force is thus produced which acts upon the circular juncture 189 to impart a uniform outwardly directed radial force upon the disc 186 thereby maintaining a constant and continuous pressure of the edge 198 against the wall 122. This pressure upon the edge 198 forms a circular groove 202 in the wall 122 and with the edge partially embedded in the wall 122 and held there, a vacuum tight seal is effected between the valve element 130 and the wall 122. As shown in FIGS. 6 and 7, the valve element is in closed position with the peripheral edge 198 imbedded in the groove 202. In order to open the valve, that is, to move the valve element past the outlet port 128 and free the passageway between the inlet and outlet ports, the nut 166 is rotated in a direction counter to that which locked the disc 186 to the wall 122. This rotation permits the disc 186 to assume its natural unflexed condition and out of contact with the wall 122 as shown in FIG. 9. Upon this occurence, the handwheel 156 is rotated to move the sleeve and shaft 134, 136, respectively, outwardly, or to the left as viewed in FIG. 6. When the shoulder 158 of the drive sleeve contacts the end 157 of the adjusting sleeve 142, further rotation of the handwheel is prevented and in this position of the shaft 136, the valve element will occupy the space indicated in FIG. 8.

To actuate the valve to a closed condition from the initial open position shown in FIG. 8, the handwheel 156 is rotated in order to position the edge 198 of the valve element 186 somewhere between the points 160 and 162 and the edge 198 is locked into the wall 122 as aforesaid. As was previously stated in the description of imbedding disc 34 in the groove 82 for the embodiment of FIGS. 1–5, the locking operation for the valve element 130 may be repeated many times for any one groove formed in the wall 122 since the discs 34 and 186 are structurally alike and flex under similar conditions.

In order to utilize many places on the wall 122 for "bites" of the edge 198 therein, the positioning of the disc 186 relative to the wall is controlled by the amount of rotation of the handwheel 156 as determined by the position of the lock nut 174 on the spindle end 140. As previously stated, the disc is adapted for a vacuum tight engagement relative to the wall 122 at any place therealong between the points 160 and 162. Where this point may be will be determined by the positioning of the spindle relative to the valve body 120. Whereas, the embodiment of FIGS. 1–5 requires dismantling of the valve and the substitution of various lengths of the ring 78 for extending the use of the valve in the event the groove 82 becomes too large, the use of the embodiment of FIGS. 6 and 7, may be extended without dismantling the valve as all of the adjusting devices may be operated externally of the valve. A new groove 202 may be formed and utilized by merely positioning the lock nut 174 at any desired position that is different from a previously used position.

To complete the valve structure disclosed in FIGS. 6-9, the sleeve 134 is surrounded by a bellows 204 which has one end welded to the end portion 138 of the sleeve and its other end welded to the flange 148. The bellows 204 serves to seal the chamber 124 between the wall 122 and the bellows against any leakage of air or gas that may seep along the threads of the hub 142 or between the coacting surfaces of the shoulder 144 and the flange 148. A smaller bellows 206 encircles a short portion of the shaft 136 adjacent the valve element 130 and is connected at one end to the end 138 of the sleeve and to the shaft 136 at some point along its length away from the valve element. The bellows 206 serves to seal the space adjacent the end of the chamber 124 adjacent to the port 126 from any seepage of air or gas that may occur along the coacting surfaces of the shaft 136 and the sleeve 134.

The embodiment shown in FIGS. 10-13 utilizes the valve element structure of the previously described embodiments with a straight-through valve body. This type of valve has the advantage of offering a straight-line connection between two chambers while permitting the application of a vacuum tight seal therebetween. In this embodiment, the valve 210 is in the form of a T, similar to a gate valve and comprises a valve body 212 having flanges 214 and 216 suitably welded at the ends thereof, and a generally rectangular casing 218 secured to the valve body and extending perpendicular therefrom. The valve body 212 is interiorly bounded by a cylindrical wall 220 and encloses a valve chamber 222 which is in communication with a chamber 224 defined by the wall of the casing 218.

As will be apparent from viewing FIGS. 10-13, the casing 218 serves to support and enclose a valve or closure element 226 and its operating mechanism when the valve 210 is in open condition. The valve element 226 is similar in appearance and operation to the valve elements 18 and 130 as previously described and comprises a disc 228 formed with a peripheral surface 230, a circular edge 232 therearound and a tubular portion 234 connected at end as a circular juncture 236 with the disc 228. Like the valve elements 18 and 130, the valve element 226 is heat treated to a spring temper so that the disc 228 and the tubular portion 234 are capable of exhibiting spring action when flexed and possess a hardness which will permit protrusion of the edge 232 into the material of the valve body wall 220.

The other end of the tubular portion 234, remote from the juncture 236 is closed-off by a circular plate 238 which may be made integral with the portion 234. Arranged coaxially of the tubular portion and projecting on the inward side of the plate 238 is an internally threaded well 240 which is utilized to detachably secure the valve element 226 to a threaded stud 242 mounted on a movable slide bar 244. The bar 244 constitutes the movable element of a toggle drive system utilized to effect a vacuum tight seal between the valve element 226 and the wall 220 of the valve body 212.

The toggle drive comprises the movable slide bar 244, a horizontally disposed cylinder 246 slidably supporting the slide bar at one end, a circular fixed block 248 secured to the other end of the cylinder and a pair of links 250 and 252 pivotally connected together at one end of each by a pivot pin 254 and connected at their other ends, respectively to the slide bar 244 and the block 248. It will be apparent that upon vertical movement of the pivot pin 254, the combined effective length of the links 250, 252 will increase, thus driving the slide bar 244, and consequently, the valve element 226 to the right, as viewed in FIG. 12. Considering the length of each of the links and the displacement of the pivot pin 254 from the position indicated in FIG. 12 to one wherein the links are in alignment, it will be obvious that a relatively large force is produced for effecting a seal between the edge 232 and the wall 220 of the valve body.

Figure 11:
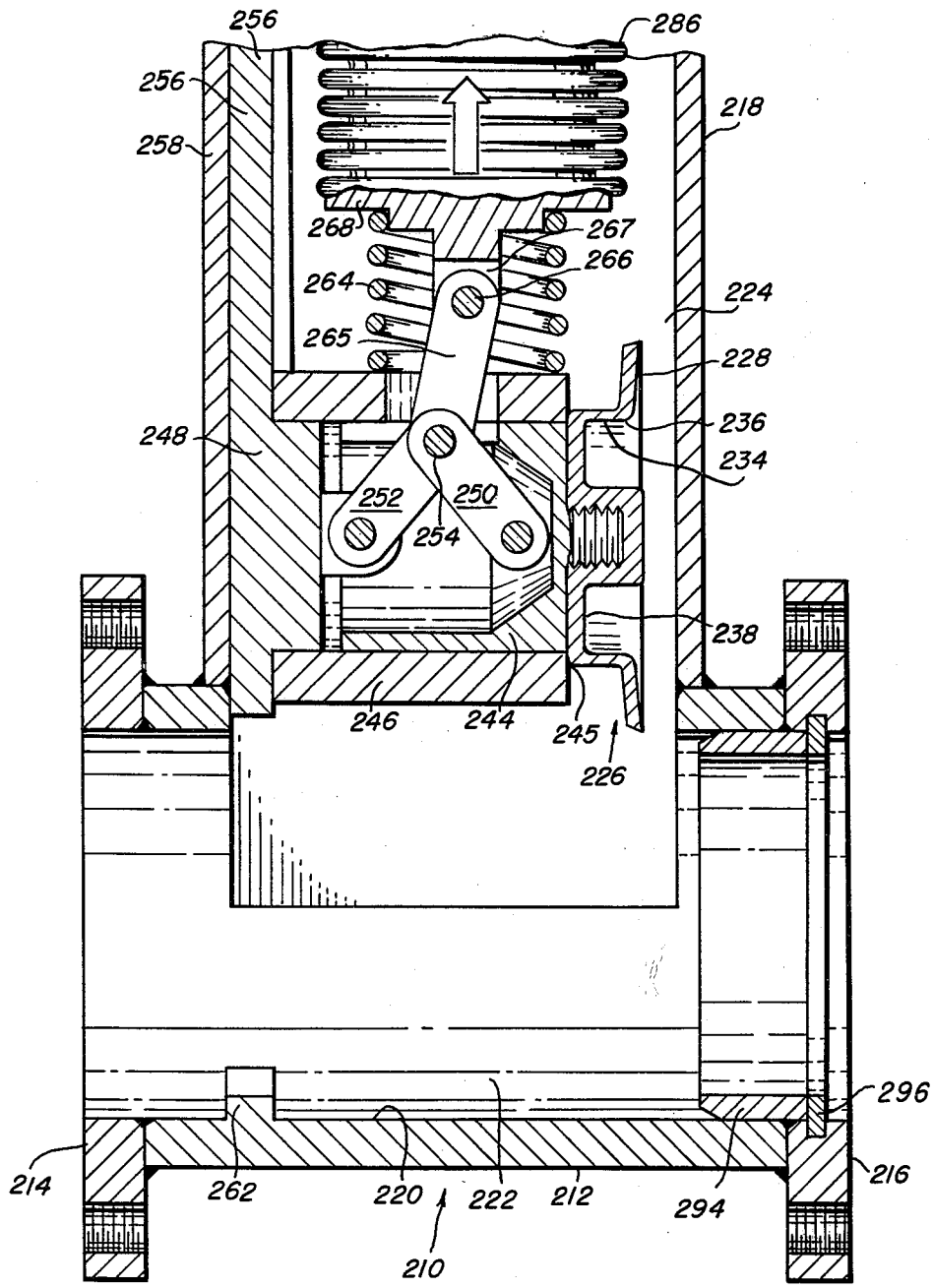
FIGURE 11 is a partial sectional view of the valve shown in FIG. 8 illustrating the valve element in a retracted position for permitting straight-through passage through the valve body.
Figure 12:
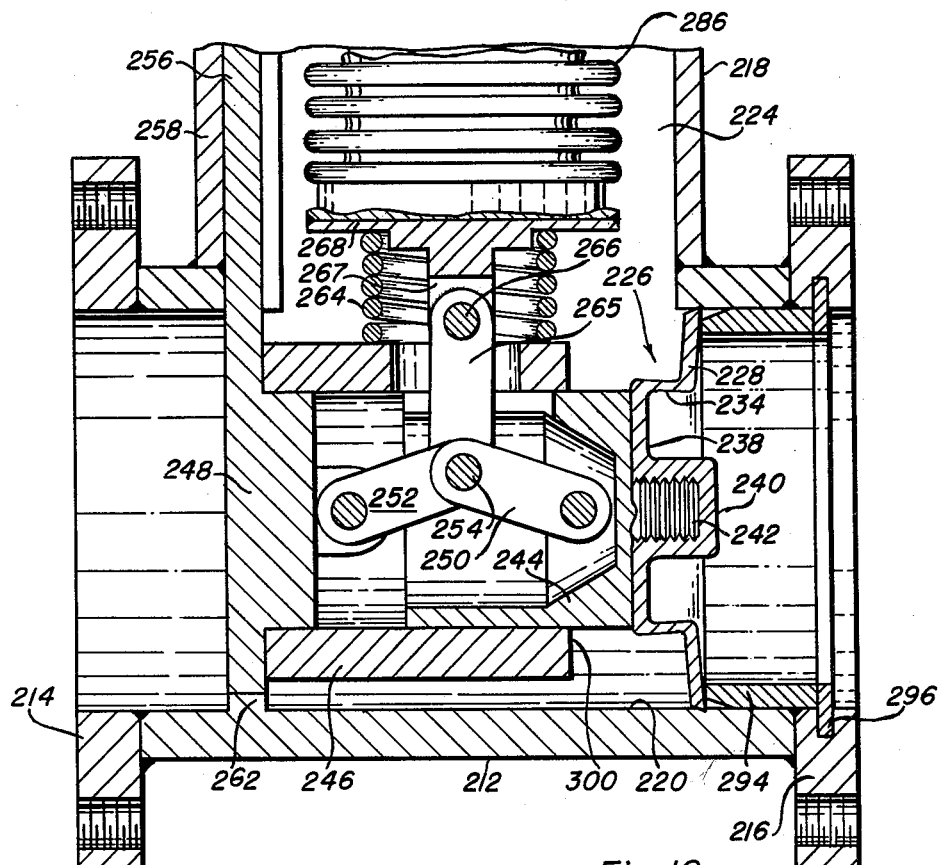
FIGURE 12 is a view similar to FIG. 9 showing the valve element in closed position.

Means are provided for guiding the movement of the toggle drive system and the valve element 226 vertically in either direction between the position shown in FIG. 12 to a fully retracted position within the casing 218, as illustrated in FIG. 11. This means takes the form of a flat guide plate 256 secured to the flat outer side of the fixed block 248 and extending upwardly into the casing 218 along one wall 258 thereof. The plate is retained for sliding movement upon the wall 258 by two pairs of opposed guide lugs 260 secured to the wall 258 and extending over the adjacent edges of the plate 256 so as to maintain the latter against the wall but permit sliding movement thereon. When in its lowermost position, the block 248 engages a semi-circular ridge 262 formed on the lower section of the wall 220 and serving as a stop for the vertical lowering of the cylinder 246 for maintaining a fixed position of the valve element 226.

Retraction of the valve element, the toggle drive system and the guide plate 256 to a position wholly within the casing 218 is performed by a drive mechanism comprising a coil spring 264 engageable with the top of the cylinder 246 and a connecting link 265 which serves to support the toggle drive and the valve element. The link 265 is pivotally connected at one end to the pivot pin 254 and at the other end to a pivot 266 mounted on a U-shaped lug 267 centrally secured to the under surface of a vertically movable plate 268. The upper end of the spring, as viewed in FIG. 10, encircles the link 265 and is also secured to the plate 268 which in turn is connected to the lower end of a vertically disposed tube 269 arranged above and centrally of the plate. At the upper end of the tube 269, the internal surface is provided with threads 270 for cooperation with a relatively long and vertically disposed drive screw 272.

The screw 272 projects out of the open upper end of the casing 218 and through an opening 274 formed centrally in a cover plate 276 suitably secured for vacuum tightness to a flange 278 welded to the casing. A circular ring 280 made integral with screw 272 at a point above the plate 276 overlaps the opening 274 to prevent downward axial movement of the screw. A flanged bonnet 282 is arranged centrally of the opening 274 and the ring 280 to maintain the latter against upward axial movement and withdrawal of the drive screw. The opening 274 is sufficiently large to permit unrestricted rotation of the drive screw and with the ring 280 being axially retained between the cooperating portions of the plate 276 and the bonnet 282, it will be obvious that the drive screw 272 is locked against axial movement but is free to rotate. A handwheel 284 is secured to the outer end of the screw to permit manual rotation thereof in either direction.

With the ends of the link 265 pivotally mounted on the pivots 254 and 266, respectively, rotation of the drive screw 272 will axially drive the tube 269 therealong carrying with it the link 265, the toggle drive system and the valve element 226. Depending upon the direction of rotation of the drive screw, the valve element and its associated actuating toggle system is adapted for movement between the positions indicated in FIGS. 11 and 12, respectively. A relatively long bellows 286 encircles the tube 270 and the drive screw and has one end welded to the periphery of the plate 268 and its other end welded to a thimble 288 surrounding the opening 274 and which in turn is secured in a vacuum tight arrangement relative to the undersurface of the plate 276. In this manner, the chamber 224 of the casing 218 and the valve body chamber 222 are free from external atmospheric effects that may seep around the bonnet 282 and ring 280 and travel along the drive screw.

The drive screw 272 and the link 265 also serve to effect a "bite" between the edge 232 of the disc 228 and the wall of the valve body. Upon lowering of the plate 268 during rotation of the drive screw in a direction to close the valve, the spring 264 transmits this motion to the toggle drive system until the lower edge of the block 248 engages the ridge 262 whereupon further movement of the toggle drive is prevented. Continued rotation of the drive screw will cause the plate 268 to lower, thus compressing the spring 264 as shown in FIG. 12. During this compressing of the spring, which then maintains the toggle drive and valve element in a fixed position, the movement of the plate 268 imparts a downward force upon the link 265 which in turn drives the pivot pin 254 downwardly to cause straightening of the toggle links 250 and 252. Straightening of the links will impart a relatively large force upon the slide bar 244 for forcing the edge 232 into the surface of the wall 220 in much the same manner as previously described for the embodiment illustrated in FIGS. 1–5 and 6–9.

Figure 13:
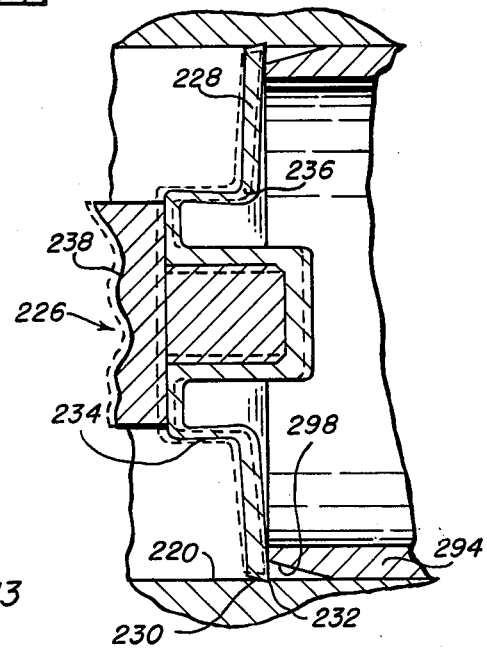
FIGURE 13 is a detailed view of the valve element embodied in the valve of FIG. 8.

In detail as shown in FIG. 13, the disc 228 of the valve element 226 is adapted to engage the circular end of a bushing 294 detachably retained on the wall 220 by a lock ring 296. Normally, the diameter of the edge 232 is slightly smaller than the diameter of the wall 220 when the disc 228 is unflexed. This condition of the valve element is illustrated by dotted lines in FIG. 13. During the last stage of elongation of the links 250 and 252, the various parts of the valve element will occupy their respective positions indicated by the solid lines. In order to experience this condition, the valve element under the force produced by the toggle drive, is moved into contact with the adjacent end of the bushing 294 and held thereby against further movement to the right. Continued force upon the valve element causes axial flexing of the disc 228 with consequent expansion of the circular edge 232 and the "biting" of the same into the wall 220 to form the groove 230 therein. Simultaneous with this expansion of the edge 232, the inner circular juncture 236 of the disc contracts and flexes the adjacent end of the tubular portion 234. These actions result in a continual radial force being imposed upon the juncture 232 relative to the wall 220 produced by the combined stresses developed by the flexing of the disc 228 and the tubular portion 234. In practice, the flexing of the disc 228 may be sufficient alone to produce a vacuum tight seal between the edge 232 and the wall 220. However, utilization of the flexing of the tubular portion 234 does enhance the force imposed upon the edge. The flexing of the discs 34 and 186, in the previously described embodiments similarly may be sufficient in themselves for producing a vacuum tight seal relative to their respective wall valve seats. In order to minimize any adverse effect against movement of the edge 232 into the wall 220 by the bushing 294, the same is chamfered at 298 along its exterior surface at the end thereof contacting the disc 228.

In order to retract the toggle drive and the valve element and open the valve for straight-through utilization, the handwheel 284 is rotated in a direction counter to that for closing the valve. The initial turning of the drive screw 272 will permit relaxation of those parts of the valve element under stress and the movement of the same to a position wherein the edge 232 is clear of the wall 220. Continued rotation of the screw causes the spring 264 to assume its normal unflexed condition and the raising of the link 264 for folding the links 250 and 252, thereby actuating the valve element to the left as viewed in FIG. 12 to a point wherein the disc 228 will be in vertical alignment with some open space within the casing 218. When the links 250 and 252 have been completely folded and the plate 238 of the valve element is against the end 300 of the cylinder 246, further rotation of the drive screw will raise the link 265 for imparting upward movement to the toggle drive and the valve element 226 until these parts are fully encased within the casing 218.

During actuation of the valve element to its closed or open positions, it will be noted that the block 248 remains stationary as does the pivot for the link 252. Folding and unfolding of the links 250 and 252 produces motion only for the movable bar 244, resulting in a movement for the latter that is twice as long as it would be if both blocks were moved equally. In order to compensate for the slight pivotal movement that the link 265 will make as a result of the arcuate motion that will be imparted to the pivot pin 254 since the link is fixed at one end, the pivot pin 266 for the link 290 is offset slightly from the pin 254 when the toggle drive is fully folded, as shown in FIG. 11. This offset also serves to maintain the full elongation effect of the links 250 and 252 which would otherwise be somewhat diminished by having a fixed pivot for one of the links. As shown in FIG. 12, when the toggle drive is fully extended, the pivot pins 254 and 290 are arranged to be in vertical alignment.

From the foregoing, it will be apparent that the principal object of the invention, that of incorporating in a valve a metal-to-metal vacuum tight seal between a valve element and its seat, is achieved. It is also apparent that this seal may be easily broken and reinstated and requires simple parts and actions. Other advantages are also readily apparent, such as, minimum of parts which are simple and inexpensive. While there is in this application specifically described three embodiments which the invention may assume in practice, it will be understood that the same is shown for purposes of illustration only, and that the same or parts thereof may be modified and embodied in various other forms or employed in other uses without departing from their spirit or the scope of the appended claims.

The valve or closure elements 18, 130 and 226 may be made very large, say on the order of 18 inches in diameter and greater and utilized as closure or hatch elements cooperable with correspondingly large cylindrical walls for sealing off large chambers such as rooms, space chambers and personnel passageways.

I claim:

1. A closure mechanism comprising a cylindrical wall defining a chamber, a closure element having a conical disc member of a hardness greater than that of said wall and being adapted for flexing axially, said disc member being formed with a centrally located circular opening defined by an inner circular edge, said disc member being formed with an outer peripheral circular edge having a diameter slightly smaller than the diameter of the wall when said disc member is unflexed and a diameter slightly greater than the wall when said disc member is flexed axially, a hollow cylindrical member secured all along one end thereof to the inner edge of said disc, and means operatively associated with said closure element for flexing said disc axially to expand the diameter of said circular edge whereby the latter becomes partially imbedded in said wall, said flexing of said disc member producing contraction of the inner edge thereof for flexing radially inwardly said end of said cylindrical member.

2. A closure mechanism comprising a cylindrical metallic wall defining a chamber, a closure element having a conical disc member made from spring material of a hardness greater than that of said wall and being adapted for flexing axially, said disc member being formed with a centrally located circular opening defined by an inner circular edge, said disc member being formed with an outer peripheral circular edge having a diameter slightly smaller than the diameter of the wall when said disc member is unflexed and a diameter slightly greater than the wall when said disc member is flexed axially, a hollow cylindrical member secured all along one end thereof to the inner edge of said disc, and means operatively associated with said closure element for flexing said disc axially to expand the diameter of said circular edge whereby the latter becomes partially imbedded in said wall, said flexing of said disc member producing contraction of the inner edge thereof for flexing radially inwardly said end of said cylindrical member, said flexing of said member being adapted to produce stress forces for aiding in maintaining said edge imbedded in said wall.

3. A valve comprising a valve body having a cylindrical wall formed therein for defining a valve chamber, a valve element having a conical disc member being adapted for flexing axially, said disc member being formed with a centrally located circular opening defined by an inner circular edge, said disc member being formed with an outer peripheral circular edge having a diameter slightly smaller than the diameter of the wall when said disc member is unflexed and a diameter slightly greater than the wall when said disc member is flexed axially, a hollow cylindrical member secured all along one end thereof to the inner edge of said disc, and means mounted in said valve for flexing said disc axially whereby said inner edge contracts to flex radially inwardly said end of said cylindrical member.

References Cited in the file of this patent

UNITED STATES PATENTS

| | | |
|---|---|---|
| 925,729 | Speer | June 22, 1909 |
| 933,863 | Thompson | Sept. 14, 1909 |
| 1,654,516 | Wilson | Dec. 27, 1927 |
| 2,106,736 | Haas | Feb. 1, 1938 |
| 2,147,332 | Cornelius | Feb. 14, 1939 |
| 2,218,871 | Broden | Oct. 22, 1940 |
| 2,585,667 | Meador | Feb. 12, 1952 |